United States Patent [19]

Tadokoro et al.

[11] 4,423,711
[45] Jan. 3, 1984

[54] MULTIPLE PORT INTAKE MEANS FOR ROTARY PISTON ENGINES

[75] Inventors: Tomoo Tadokoro; Nobuhiro Hayama; Toshimichi Akagi, all of Hiroshima, Japan

[73] Assignee: Toyo Kogyo Co., Ltd., Hiroshima, Japan

[21] Appl. No.: 283,744

[22] Filed: Jul. 15, 1981

[30] Foreign Application Priority Data

| Jul. 16, 1980 | [JP] | Japan | 55-97860 |
| Jul. 16, 1980 | [JP] | Japan | 55-97861 |
| Jul. 16, 1980 | [JP] | Japan | 55-97862 |
| Jul. 16, 1980 | [JP] | Japan | 55-97864 |

[51] Int. Cl.³ .................................................. F02B 53/06
[52] U.S. Cl. ........................................ 123/242; 123/216
[58] Field of Search ................ 123/216, 219, 242, 393

[56] References Cited

U.S. PATENT DOCUMENTS

| 2,722,926 | 11/1955 | Bradnick | 123/393 |
| 3,827,408 | 8/1974 | Ishikawa | 123/216 |
| 3,934,558 | 1/1976 | Wilmers | 123/242 |
| 4,030,454 | 6/1977 | Yamamoto et al. | 123/219 |
| 4,315,488 | 2/1982 | Tadokoro et al. | 123/216 X |

*Primary Examiner*—Michael Koczo
*Attorney, Agent, or Firm*—Fleit, Jacobson, Cohn & Price

[57] ABSTRACT

A rotary piston engine including a casing comprised of a rotor housing and a pair of side housings attached to the opposite sides of the rotor housing to define a rotor cavity. A substantially triangular rotor is disposed in the rotor cavity. The intake system includes a light load intake port formed in one of the side housings so as to open to the rotor cavity, a medium load and heavy load intake ports formed in the other side housing. The light load and medium load intake ports are formed so that they are opened to a working chamber after the chamber is disconnected from the exhaust port and closed substantially simultaneously. The heavy load intake port is associated with a control valve which is closed under light and medium load operations.

6 Claims, 7 Drawing Figures

MULTIPLE PORT INTAKE MEANS FOR ROTARY PISTON ENGINES

The present invention relates to rotary piston engines and more particularly to an intake system for rotary piston engines.

Conventional rotary piston engines include a casing comprised of a rotor housing having a trochoidal inner wall and a pair of side housings attached to the opposite sides of the rotor housing to define a rotor cavity therein, and a substantially polygonal rotor disposed in the casing for rotation with apex portions in sliding engagement with the inner wall of the rotor housing to define working chambers of variable volumes to conduct intake, compression, combustion, expansion and exhaust strokes.

The casings are formed with exhaust and intake ports which open respectively to the working chambers in the exhaust and intake strokes. The exhaust ports are usually formed in the rotor housings and the intake ports in either or both of the rotor and side housings. In conventional rotary piston engines, the exhaust and intake ports are so located that there is an overlap period wherein the ports are opened simultaneously to the same working chamber. In this arrangement, problems have been encountered in that the combustion gas in the exhaust port is at first drawn under the intake suction pressure through the intake port into the intake passage and then back into the working chamber in the intake stroke as the volume of the working chamber increases. The combustion gas thus taken into the intake working chamber dilutes the intake mixture possibly producing misfire. This causes rough engine operations and an increase in the amount of pollutant emissions in the exhaust gas. The adverse effect of the overlap is particularly significant in idling and light load engine operations wherein the charge of the intake mixture is relatively small.

It has therefore been conventional practice to supply comparatively rich air-fuel mixture of small air-fuel ratio in the idling and light load conditions to obtain a stable operation. However, the solution has not been satisfactory because fuel consumption cannot be decreased to a level that can meet the requirement in recent years. Efforts may therefore be made to eliminate the aforementioned overlap period.

In rotary engines of a peripheral port type having intake ports formed in the rotor housings, however, it is extremely difficult to arrange the intake and exhaust ports so that the overlap can be avoided. In a side port type wherein the intake ports are formed in the side housings, it is possible to arrange the intake ports so that the overlap can be avoided. However, in such arrangements, the opening areas of the intake ports are limited in various respects and it becomes impossible to supply a sufficient amount of intake mixture to meet the high output requirement.

More specifically, in an intake port formed in the side housing, the radially inner edge of the port must be outside the trace of the oil seal carried by the rotor. The location of the radially outer edge is determined by the port opening timing, whereas the location of the leading side edge as seen in the direction of rotor rotation is determined by the port closing timing. Thus, in order to avoid the overlap between the intake and exhaust ports, the radially outer edge of the intake port must be located radially inwardly as compared with conventional intake ports. This will cause a decrease in the port area and in order to compensate for such a decrease in the port area, the location of the leading edge must be changed so that the port closing time is delayed. However, a delay in the intake port closing timing will cause a blow back of the intake mixture into the intake passage, particularly in heavy load, low speed engine operations, to thereby cause a decreased in the intake charge and consequently a decrease in the compression pressure in the working chamber.

It is therefore an object of the present invention to provide an intake system for a rotary piston engine in which the overlap between the exhaust and intake ports can be eliminated without causing substantial decrease in the port area.

Another object of the present invention is to provide an intake system for a rotary piston engine in which the intake port area can in effect be changed in accordance with the engine load.

A further object of the present invention is to provide an intake system for a rotary piston engine in which an improved atomization of fuel can be accomplished even under light load engine operations.

Still further object of the present invention is to provide a rotary piston engine intake system in which a stable operation can be ensured under light load condition with a relatively lean mixture.

According to the present invention, the above and other objects can be accomplished by a rotary piston engine including a casing comprised of a rotor housing having a trochoidal inner wall and a pair of side housings secured to the opposite sides of the rotor housing to define a rotor cavity therein, a substantially polygonal rotor disposed in said rotor cavity for rotation with apex portions in sliding engagement with the inner wall of the rotor housing to define working chambers of variable volumes to conduct intake, compression, combustion, expansion and exhaust strokes, exhaust port means formed in said casing so as to open to said rotor cavity at the working chamber in the exhaust stroke, first intake port means formed in at least one of the housings so as to open to said rotor cavity at the working chamber in the intake stroke, said first intake port means is located so that it is opened to the working chamber after the same working chamber is substantially disconnected from the exhaust port means, second intake port means formed in at least one of said side housings so as to open through at least one opening to said rotor cavity at the working chamber in the intake stroke and located so that it is disconnected from the same working chamber later than the first intake port means, said second intake port means being associated with control valve means which closes the second intake port means in light load engine operation.

According to the features of the present invention, only the first intake port means is used to draw the intake mixture into the working chamber under a light load engine operation. Since the first intake port means is located so that there is no overlap period wherein the exhaust and intake port means are opened simultaneously to the same working chamber, there is no risk that the exhaust gas in the exhaust port means is drawn into the intake port means. It is therefore possible to prevent or at least significantly decrease the dilution of the intake mixture by the exhaust gas. In heavy load operation and possibly in medium load operation, the valve means is opened and a sufficient amount of intake mixture can be drawn to meet the increased output requirement.

According to a further feature of the present invention, at least one of said side housings may further be formed with third intake port means which opens to the rotor cavity at the working chamber in the intake stroke and located so that it is opened to the working chamber after the same working chamber is substantially disconnected from the exhaust port means and closed substantially simultaneously with the first intake port means. The intake system may include a primary intake passage having a primary throttle valve and a secondary intake passage having a secondary throttle valve which is closed under a light load operation, and the primary passage may be connected with the first intake port means and the secondary passage with the second and third intake port means. With this arrangement, it becomes possible to change the intake port area in three stages in accordance with the engine load.

According to a preferable aspect of the present invention, the first port means is formed in one side housing and the third intake port means in the other side housing. They may be of the same configuration and located so that they are opened to the working chamber and disconnected therefrom substantially simultaneously. The control valve means may include a substantially cylindrical valve member disposed for rotation about its longitudinal axis in a substantially cylindrical bore formed in the second intake port means and having aperture means adapted to be aligned with the opening of the second intake port means. An actuator for operating the valve member may preferably be driven by the exhaust gas pressure.

The above and other objects and features of the present invention will become apparent from the following descriptions of a preferred embodiment taking reference to the accompanying drawings, in which.

Figure 1:
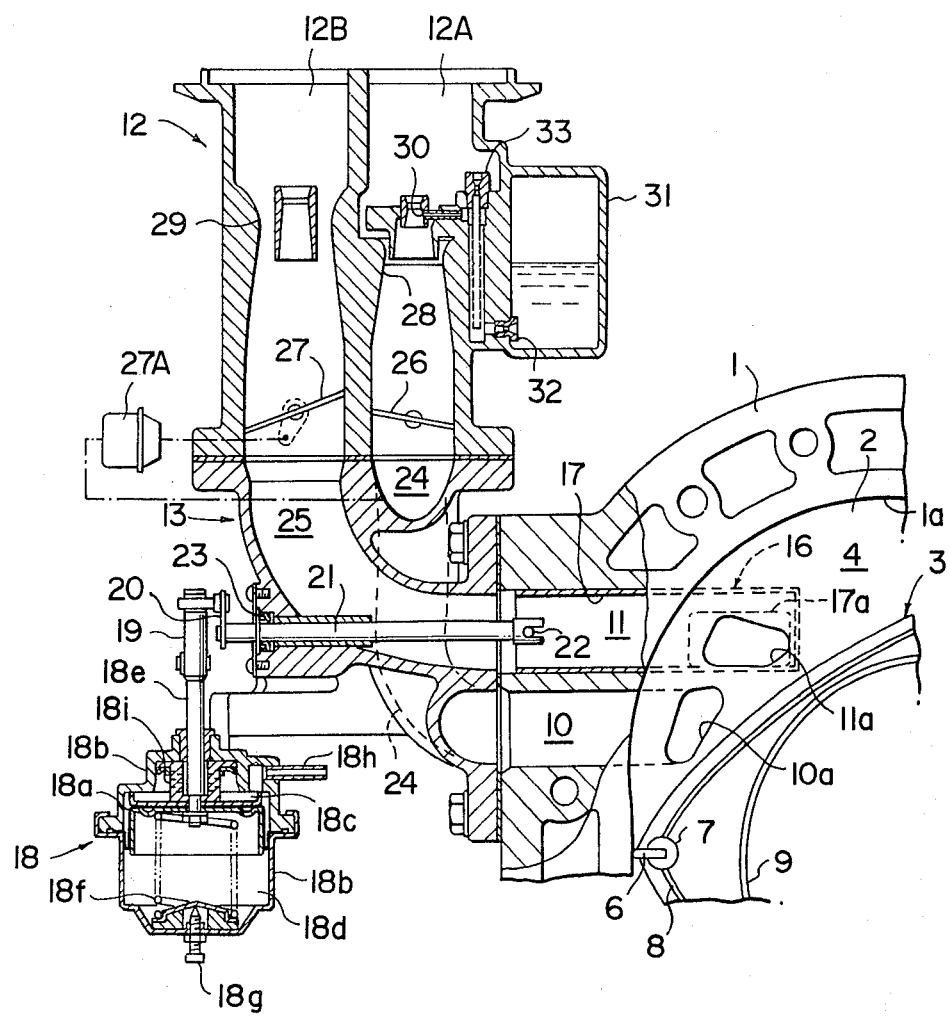
FIG. 1 is a fragmentary sectional view of a rotary piston engine in accordance with one embodiment of the present invention.
Figure 2:
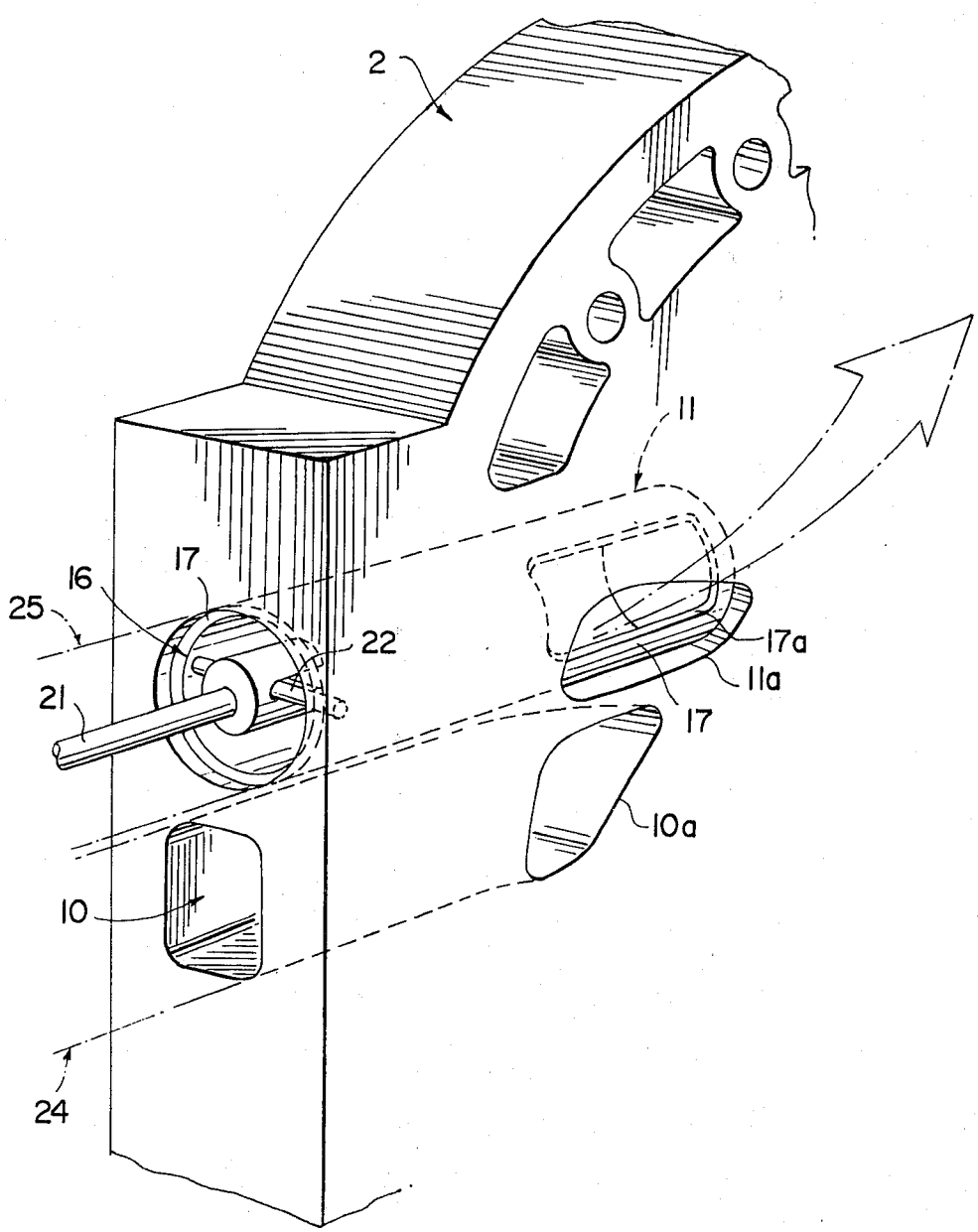
FIG. 2 is a fragmentary perspective view of a side housing formed with intake ports in accordance with the present invention.
Figure 3:
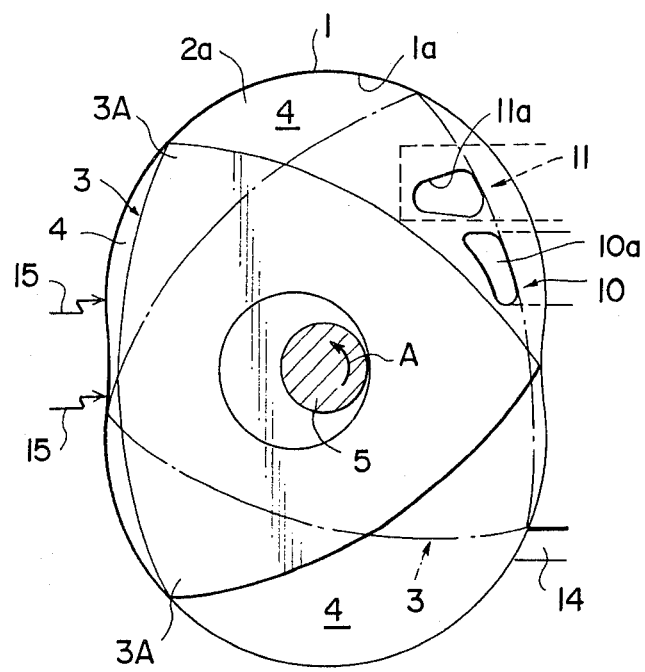
FIG. 3 is a diagrammatical illustration of a rotary piston engine showing the port arrangement.
Figure 4:
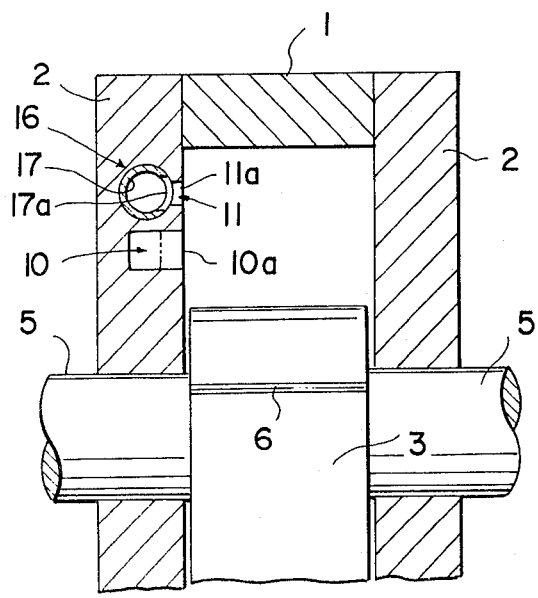
FIG. 4 is a longitudinal sectional view of the rotary piston engine.

Referring now to the drawings, particularly to FIGS. 1 through 4, there is shown a rotary piston engine including a rotor housing 1 and a pair of side housings 2 secured to the opposite sides of the rotor housing 1 to define a rotor cavity. The rotor housing 1 has an inner wall 1a which is of a trochoidal configuration as shown in FIG. 3. In the rotor cavity, there is disposed a substantially triangular rotor 3 for rotation with apex portions 3a in sliding contact with the inner wall 1a of the rotor housing 1 so as to define working chambers 4 of variable volume to conduct an intake, compression, combustion, expansion and exhaust strokes. The rotor 3 is carried by an eccentric shaft 5 and on the apex portions 3a of the rotors 3, there are provided apex seals 6 as well known in the art. Further, the rotor 3, is also provided with corner seals 7, side seals 8 and oil seals 9 as shown in FIG. 1.

As shown in the drawings, one of the rotor housings 2 is formed with light load intake ports 10 which open through an opening 10a to the rotor cavity at the working chamber 4 which is in the intake stroke. Further, the same side housing 2 is formed with a heavy load intake port 11 which is opened through an opening 11a to the rotor cavity at the working chamber 4 in the intake stroke.

The openings 10a and 11a of the intake port 10 and 11 are located so that they are cyclically closed by the side surfaces of the rotor 3. As shown in FIG. 3, the rotor housing 1 is formed with an exhaust port 15 which opens to the rotor cavity at the working chamber 4 in the exhaust stroke. Further, ignition plugs are mounted on the rotor housing 1 as well known in the art. In FIG. 3, the rotor 3 rotates counterclockwise as shown by an arrow A. The opening 10a of the light load intake port 10 is located so that it is opened to the intake working chamber 4 after the same chamber is disconnected from the exhaust port 15 and closed at a relatively earlier stage so that the blow back of the intake mixture to the intake port 10 can be prevented. The opening 11a of the heavy load intake port 11 is located so as to be closed after the port 10 is closed. The opening 11a may be so formed that it is opened substantially at the same time as the opening 10a or it may be opened earlier than the opening 10a.

In the illustrated embodiment, the engine has a dual-barrel type carburetor 12 which includes a primary passage 12A and a secondary passage 12B. The carburetor 12 is mounted on the engine casing through a manifold assembly 13 having primary intake passages 24 and secondary intake passages 25 which are respectively connected with the passages 12A and 12B in the carburetor 12. The primary passage 12A in the carburetor 12 is provided with a primary throttle valve 26 and the secondary passage 12B with a secondary throttle valve 27. In the primary passage 12A, there is formed a primary venturi portion 28 in which a main fuel nozzle assembly 30 is provided as in conventional carburetors. The main fuel nozzle assembly 30 is connected through an air bleed device 33 and a main jet 32 with a float chamber 31. The secondary passage 12B is formed with a secondary venturi portion 29 which may have a fuel nozzle assembly although not shown in FIG. 1. As is well known in the art, the secondary throttle valve 27 starts to open after the primary throttle valve 26 has been substantially fully opened or under medium and heavy load operations. For this purpose, a suction pressure operated actuator 27A is provided for actuating the throttle valve 26 in accordance with the pressure in the passage 24. Alternatively, the throttle valve 27 may be interconnected with the throttle valve 26.

The primary passage 12A of the carburetor 12 is connected through the passages 24 in the manifold assembly 13 with the opening 10a of the intake port 10. The secondary passage 12B is connected through the passages 25 in the manifold assembly 13 with the opening 11a of the intake port 11. The heavy load intake port 11 is provided adjacent to the opening 11a with a control valve 16 which includes a hollow cylindrical valve member 17 rotatably inserted into a cylindrical bore formed in the intake port 11. The valve member 17 has an aperture 17a which is aligned with the opening 11a as shown in FIG. 1 when the valve member 17 is in the position shown in FIG. 1 but disconnected from the opening 11a when the valve member 17 is rotated.

In order to rotatably move the cylindrical valve member 17, there is provided an actuator 18 which is comprised of a casing 18b having a diaphragm 18a for dividing the interior of the casing 18b into a pressure chamber 18c and an atmospheric pressure chamber 18d. The diaphragm 18a is connected with a push-pull rod 18e which is in turn connected through a link 19 and a lever 20 with an actuating rod 21 so that the axial movement of the rod 18e is converted into a rotation of the actuating rod 21. The actuating rod 21 is connected with the valve member 17 by means of a pin 22 so that the rotation of the actuating rod 21 is transmitted to the valve member 17. A gas seal 23 is provided between the intake manifold 13 and the actuating rod 21.

In the atmospheric pressure chamber 18d of the actuator 18, there is provided a compression spring 18f which biases the diaphragm 18a upwardly so that the valve member 17 is forced toward the position wherein the aperture 17a in the valve member 17 is disconnected from the opening 11a to thereby close the intake port 11. The force of the spring 18f can be adjusted by the adjusting screw 18g. The pressure chamber 18c is connected with an exhaust gas pressure pipe 18h which introduces the exhaust gas pressure into the chamber 18c. In the pressure chamber 18c, there is provided a solid type bellows 18i which has circumferential slits formed alternately in inner and outer peripheries thereof. The bellows 18i encircles the rod 18e and is attached at one end to the casing 18b and at the other to the diaphragm 18a to thereby provide an expansible seal.

In idling or light load operations, the secondary throttle valve 27 of the carburetor 12 is closed so that there is no supply of intake mixture to the passage 25 leading to the intake port 11. In this instance, the exhaust gas pressure is small so that the diaphragm 18a in the actuator 18 is forced under the influence of the spring 18f to maintain the control valve 17 in the closed position. Since the control valve 17 is located close to the opening 11a, the dead volume in the port 11 is very small. Therefore, it is possible to decrease carrying over of the exhaust gas through the port 11. The intake mixture is supplied to the working chamber 4 only through the intake port 10. Since the intake port 10 is so located that it is opened to the working chamber 4 after the same working chamber 4 is disconnected from the exhaust port 15, it is possible to eliminate or substantially decrease carrying over of the exhaust gas into the intake working chamber 4 due to the overlap between the intake and exhaust ports. Further, only one intake port 10 of a relatively small area is used for the rotor cavity so that it is possible to maintain a relatively high flow speed of the intake mixture to thereby provide an improved atomization and vaporization of fuel even under such idling or light load engine operations. Thus, it becomes possible to obtain stable combustion even with a relatively lean mixture and consequently fuel consumption can be significantly reduced.

In heavy load operation, the secondary throttle valve 27 of the carburetor 12 is opened and the exhaust gas pressure is increased beyond the value wherein the diaphragm 18a is moved against the influence of the spring 18f to actuate the valve member 17 to the open position wherein the aperture 17a in the valve member 17 is aligned with the port opening 11a. Thus, the intake mixture is supplied through both the ports 10 and 11. As shown in FIG. 2, in the illustrated embodiment, the arrangement is such that the port opening 11a starts to open at the leading side thereof as the valve member 17 is moved toward the fully open position. In the partially open position shown in FIG. 2, the intake mixture is therefore discharged toward the leading direction as shown by an arrow and provide a highly combustible atmosphere around the ignition plugs.

It will therefore be understood that a large amount of intake mixture is supplied under a heavy load operation through the intake ports 10 and 11 to provide a high output power. It should be noted that the heavy load intake port 11 is so formed that it is closed later than the port 10 to provide a sufficient amount of charge. The closing timing of the heavy load intake port 11 must be determined taking into consideration the problem of blow back of the intake mixture into the intake port. In the illustrated embodiment, the port timing can be controlled to a most suitable value for providing an optimum output power under a heavy load, high speed operation since the control valve 16 is actuated by the exhaust gas pressure which corresponds to the load and speed of the engine.

In the illustrated embodiment, it is preferable to provide the outer surface of the cylindrical valve member 17 and/or the inner surface of the cylindrical bore in the intake port 11 with a coating of a fluorinated resin such as Teflon for the purpose of providing a satisfactory lubrication. In order to eliminate the possible seizure of the valve member 17 in the cylindrical bore, it is recommendable to open the valve 16 under starting and decelerating operations because in such operations, the intake port 11 does not have any adverse effect. The aperture 17a in the valve member 17 should preferably be larger than the port opening 11a. The actuator for the control valve 16 may be of any type and may be operated by any signal which represents the engine load. For example, the engine intake pressure or the throttle valve position may be used alone or in combination with the engine speed.

The intake ports 10 and 11 may not necessarily be formed in the same side housing 2 but one port may be provided in one side housing 2 and the other port in the other side housing 2. With this arrangement, it becomes possible to further increase the area of the port opening 11a. In the illustrated embodiment, the opening 11a of the heavy load intake port 11 is so located that it is opened to the working chamber 4 after the same working chamber 4 is disconnected from the exhaust port 15. However, the port opening 11a may be so formed that there is a certain overlap with the exhaust port 15. Since the intake port 11 is closed by the control valve 16 which is located close to the port opening 11a, the dead volume of the port 11 is very small and there will be no appreciable amount of carrying over of the exhaust gas even if there is a certain overlap between the heavy load intake port 11 and the exhaust port 15. It should further be noted that the fuel supply system may not necessarily be of a carburetor type as in the illustrated embodiment but may be of a fuel injection type.

Figure 5:
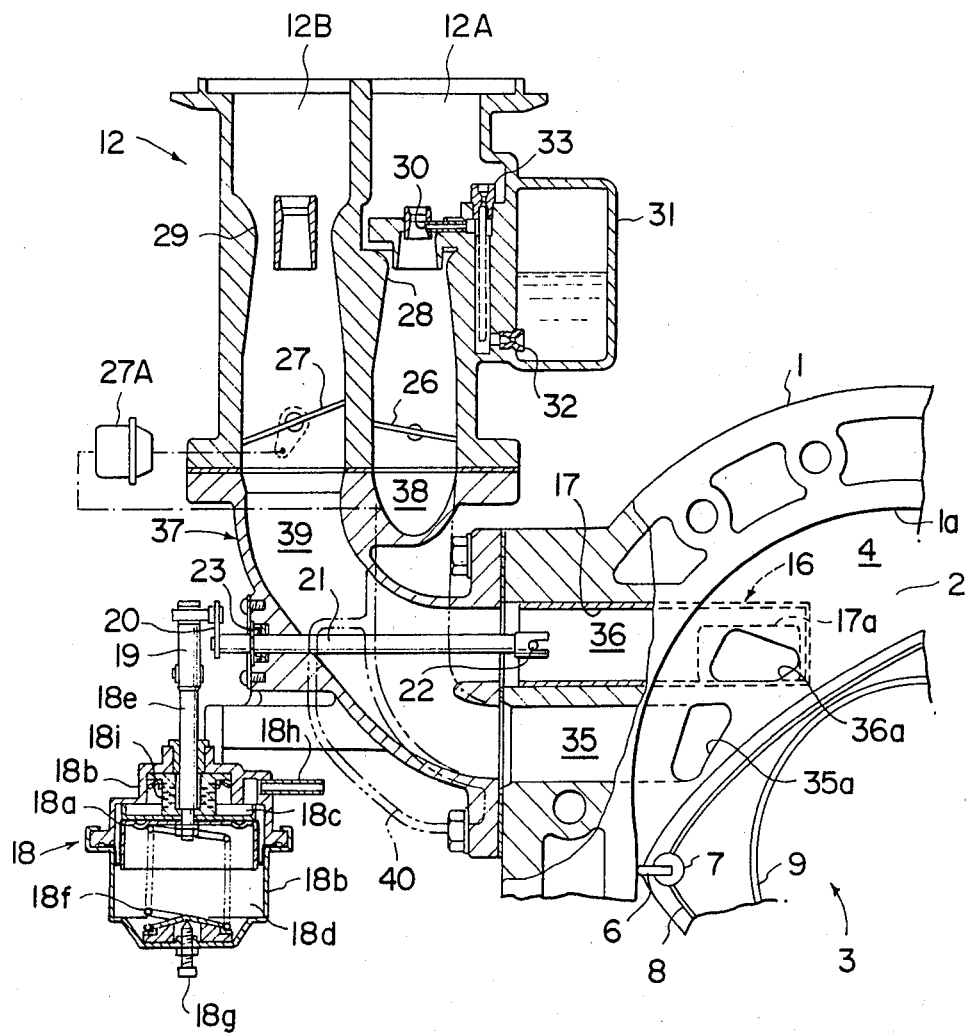
FIG. 5 is a fragmentary sectional view similar to FIG. 1 but showing another embodiment of the present invention.
Figure 6:
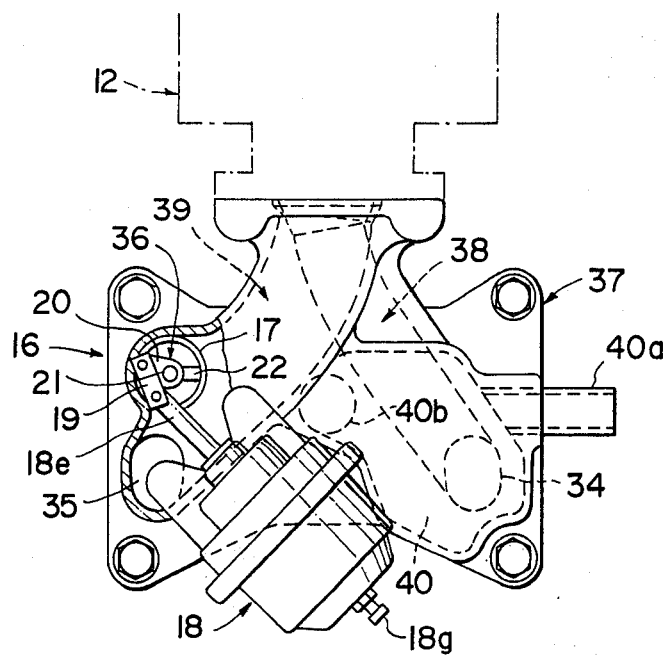
FIG. 6 is a partially sectioned front view of the rotary piston engine particularly showing the intake manifold assembly.
Figure 7:
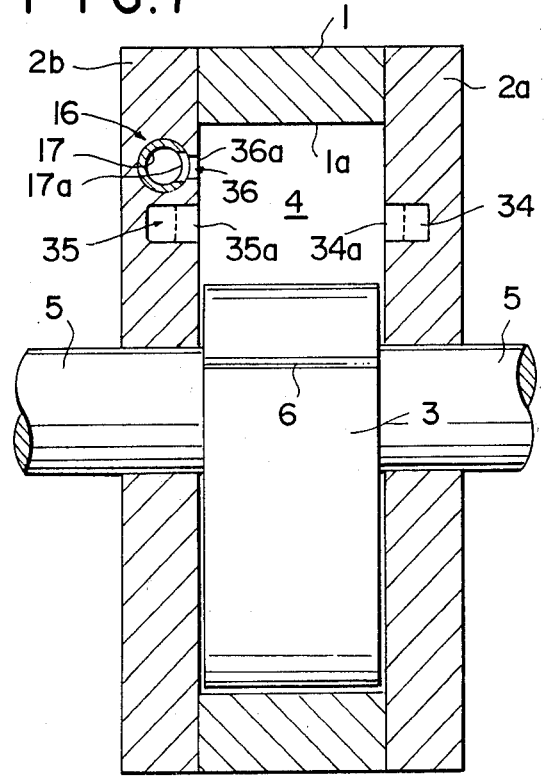
FIG. 7 is a longitudinal sectional view of the engine shown in FIG. 5.

Referring now to FIGS. 5 through 7, there is shown another embodiment of the present invention in which corresponding parts are designated by the same reference numerals as in FIGS. 1 through 4. In this embodiment, one of the side housings 2a is formed with a light load intake port 34 which opens through an opening 34a to the rotor cavity at the working chamber 4 which is in the intake stroke. The other side housing 2b is formed with an intermediate load intake port 35 which is opened through an opening 35a to the rotor cavity at the working chamber 4 in the intake stroke. The side housing 2a is further formed with a heavy load intake port 36 which opens through an opening 36a to the rotor cavity at the intake working chamber 4.

The openings 34a, 35a and 36a of the intake ports 34, 35 and 36 are located so that they are cyclically closed by the side surfaces of the rotor 3. The opening 34a of the light load intake port 34 is located so that it is opened to the intake working chamber 4 after the same chamber is disconnected from the exhaust port and closed at a relatively earlier stage so that the blow back of the intake mixture to the intake port 34 can be prevented. The opening 35a of the intermediate load intake port 35 is of the same configuration as the opening 34a and located so that it is opened and closed substantially at the same time as the opening 34a. The opening 36a of the heavy load intake port 36 is located so as to be closed after the ports 34a and 35a are closed. The opening 36a may be so formed that it is opened substantially at the same time as the openings 34a and 35a or it may be opened earlier than the openings 34a and 35a.

In the illustrated embodiment, the engine has a dual-barrel type carburetor 12 which is similar in structure as the carburetor in the previous embodiment. The carburetor 12 is mounted on the engine casing through a manifold assembly 37 having a primary intake passage 38 and a secondary intake passage 39 which are respectively connected with the passages 12A and 12B in the carburetor 12. The secondary throttle valve 27 starts to open after the primary throttle valve 26 has been substantially fully opened or under medium and heavy load operations. An actuator 27A is associated with the throttle valve 27 for the purpose as in the previous embodiment.

The primary passage 12A of the carburetor 12 is connected through the passage 38 in the manifold assembly 37 with the opening 34a of the intake port 34. In the illustrated embodiment, the passage 38 is provided with a preheating passage 40 having an inlet 40a and an outlet 40b through which the engine cooling liquid is passed. The secondary passage 12B is connected through the passage 39 in the manifold assembly 37 with the openings 35a and 36a of the intake ports 35 and 36. The heavy load intake port 36 is provided adjacent to the opening 36a with a control valve 16 which is of the same structure as the control valve in the previous embodiment and driven by an actuator 18 which is also of the same type as in the previous embodiment.

In idling or light load operations, the secondary throttle valve 27 of the carburetor 12 is closed so that there is no supply of intake mixture to the passage 39 leading to the intake ports 35 and 36. In this instance, the exhaust gas pressure is small so that the diaphragm 18a in the actuator 18 is forced under the influence of the spring 18f to maintain the control valve 16 in the closed position. Since the control valve 16 is located close to the opening 36a, the dead volume in the port 36 is very small. Therefore, it is possible to decrease carrying over of the exhaust gas through the port 36. The intake mixture is supplied to the working chamber 4 only through the intake port 34. Since the intake port 34 is so located that it is opened to the working chamber 4 after the same working chamber 4 is disconnected from the exhaust port, it is possible to eliminate or substantially decrease carrying over of the exhaust gas into the intake working chamber 4 due to the overlap between the intake and exhaust ports. The intake port 35 has the identical configuration with and located in the same manner as the port 34. Therefore, it is also possible to eliminate the carrying over of the exhaust gas through the intake port 35. Further, only one intake port 34 of a relatively small area is used so that it is possible to maintain a relatively high flow speed of the intake mixture to thereby provide an improved atomization and vaporization of fuel even under such idling or light load engine operations. Thus, it becomes possible to obtain stable combustion even with a relatively lean mixture and consequently fuel consumption can be significantly reduced.

In medium load operation, the secondary throttle valve 27 of the carburetor 12 is opened but the exhaust gas pressure is still low so that the control valve 16 is maintained in the closed position. The intake mixture is supplied through the intake ports 34 and 35. Thus, a sufficient amount of intake mixture can be supplied to meet the demand under the medium load operation.

In heavy load operation, the secondary throttle valve 27 of the carburetor 12 is further opened and the exhaust gas pressure is increased beyond the value wherein the diaphragm 18a is moved against the influence of the spring 18f to actuate the valve 17 to the open position wherein the aperture 17a in the valve member 17 is aligned with the port opening 36a. Thus, the intake mixture is supplied through all of the ports 34, 35 and 36. As in the previous embodiment, the arrangement is such that the port opening 36a starts to open at the leading side thereof as the valve member 17 is moved toward the fully open position. In the partially open position, the intake mixture is therefore discharged toward the leading direction and provide a highly combustible atmosphere around the ignition plugs.

It will therefore be understood that a large amount of intake mixture is supplied under a heavy load operation through all of the intake ports 34, 35 and 36 to provide a high output power. The heavy load intake port 36 is so formed that it is closed later than the ports 34 and 35 to provide a sufficient amount of charge. The closing timing of the heavy load intake port 36 can be determined in a similar manner as in the previous embodiment.

The invention has thus been shown and described with reference to a specific embodiment, however, it should be noted that the invention is in no way limited to the details of the illustrated arrangements but changes and modifications may be made without departing from the scope of the appended claims.

We claim:

1. A rotary piston engine including a casing comprised of a rotor housing having a trochoidal inner wall and a pair of side housings secured to the opposite sides of the rotor housing to define a rotor cavity therein, a substantially polygonal rotor disposed in said rotor cavity for rotation with apex portions is sliding engagement with the inner wall of the rotor housing to define working chambers of variable volumes to conduct intake, compression, combustion, expansion and exhaust strokes, exhaust port means formed in said casing so as to open to said rotor cavity at the working chamber in the exhaust stroke, primary intake port means formed in one of the side housings so as to open to said rotor cavity at the working chamber in the intake stroke, said primary intake port means being located so that it is opened to the working chamber after the same working chamber is substantially disconnected from the exhaust port means, secondary intake port means formed in the other side housing so as to open to said rotor cavity and located so that it is opened to and disconnected from the working chamber substantially simultaneously with the primary intake port means, auxiliary intake port means formed in at least one of the side housings so as to open through at least one opening to the rotor cavity at the working chamber in the intake stroke and located so that is is disconnected from the same working chamber later than the primary and secondary intake port means, control valve means for opening and closing said auxiliary intake port means, intake passage means having throttle valve means and connected to the primary, secondary and auxiliary intake port means, said control valve means being provided adjacent the opening of the auxiliary intake port means, actuator means for actuating the control valve means to open the same under a predetermined engine load condition.

2. A rotary piston engine in accordance with claim 1 including sensing means for sensing exhaust gas pressure, said control valve means operated in response to exhaust gas pressure.

3. A rotary piston engine in accordance with claim 1 in which said control valve means includes a hollow cylindrical valve member disposed for rotation about its longitudinal axis in a cylindrical bore communicating with said secondary intake port means, said valve member having aperture means which can be moved into and out of alignment with the openings of the secondary intake port means.

4. A rotary piston engine in accordance with claim 3 in which said control valve means is connected to pressure responsive actuator means for actuating the same, and including means for introducing exhaust gas pressure to said actuator means, said actuator means operated in response to the exhaust gas pressure to actuate the valve member to a position wherein the aperture means is at least partially aligned with the opening of the secondary intake port means to permit flow therethrough.

5. A rotary piston engine in accordance with claim 2 which further includes primary intake passage means having first throttle valve means and connected with said primary intake port means, and secondary intake passage means having second throttle valve means and connected with said auxiliary intake port means, throttle control means for opening said second throttle valve means only under predetermined engine load conditions, said control valve means operable for opening the control valve means in response to an increase in exhaust gas pressure, whereby the auxiliary intake port means and the second throttle valve means are progressively opened in response to an increase in engine load.

6. A rotary piston engine in accordance with claim 2 which further includes primary intake passage means having first throttle valve means and connected with said primary intake port means, and secondary intake passage means having secondary throttle valve means and connected with said auxiliary intake port means, means for opening said second throttle valve means only under predetermined engine conditions.

* * * * *